United States Patent [19]

Kamada et al.

[11] Patent Number: 4,756,917
[45] Date of Patent: Jul. 12, 1988

[54] PACKAGING SHEET AND CONTAINERS AND POUCHES USING THE SHEET

[75] Inventors: Mamoru Kamada, Nara; Fumiaki Nagase, Kashiwara; Eiichi Takeuchi, Osaka; Toshihiko Nakano, Kashiwara; Shoichi Makimoto, Sennan, all of Japan

[73] Assignee: Toyo Aluminium Kabushiki Kaisha, Osaka, Japan

[21] Appl. No.: 932,429

[22] Filed: Nov. 19, 1986

[30] Foreign Application Priority Data

Nov. 20, 1985 [JP] Japan ................... 60-263572
Apr. 24, 1986 [JP] Japan ................... 61-97549
Apr. 24, 1986 [JP] Japan ................... 61-97550
Aug. 12, 1986 [JP] Japan ................... 61-190982
Oct. 3, 1986 [JP] Japan ................... 61-236809
Nov. 12, 1986 [JP] Japan ................... 61-269404

[51] Int. Cl.⁴ ................... B32B 15/04; B32B 27/08
[52] U.S. Cl. ................... 428/457; 428/35; 428/461

[58] Field of Search ................... 428/461, 35, 457

[56] References Cited

U.S. PATENT DOCUMENTS 4,595,613 6/1986 Tauss et al. ................... 428/461 X
4,642,260 2/1987 Wakita et al. ................... 428/461 X Primary Examiner—Thomas J. Herbert
Attorney, Agent, or Firm—Armstrong, Nikaido, Marmelstein & Kubovcik

[57] ABSTRACT

A packaging sheet for containing foodstuff is proposed which comprises a substrate of synthetic resin and a metallic film layer laminated to the substrate through an adhesive layer and a resin layer having a lower bond strength than the adhesive layer. Food packaging containers using the packaging sheet as a lid and self-standing pouches using the packaging sheet as their side sheets are also proposed. Before such a container or pouch containing food is put into a microwave oven for cooking, the metallic film layer or layers can be removed easily from the substrate.

5 Claims, 5 Drawing Sheets

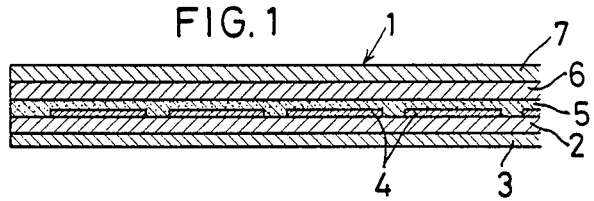
FIG. 1
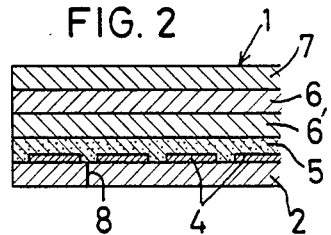
FIG. 2
FIG. 3
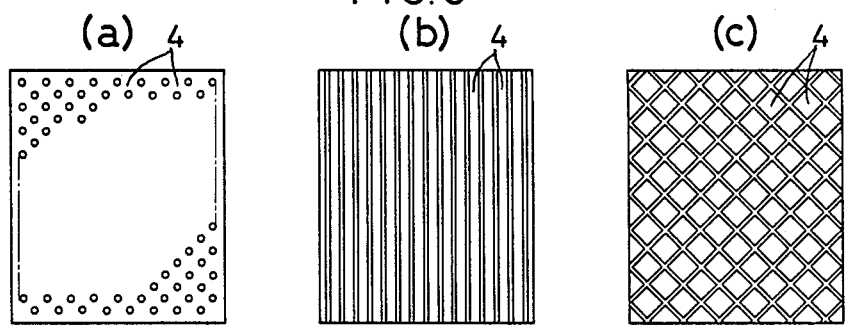
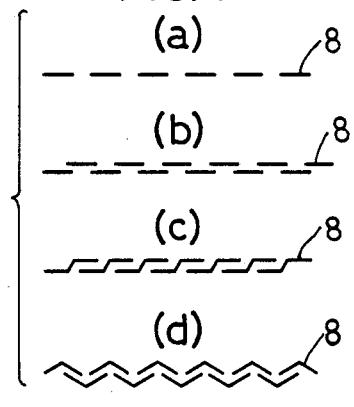
FIG. 4
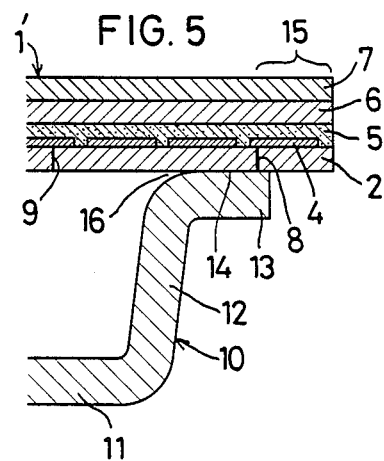
FIG. 5

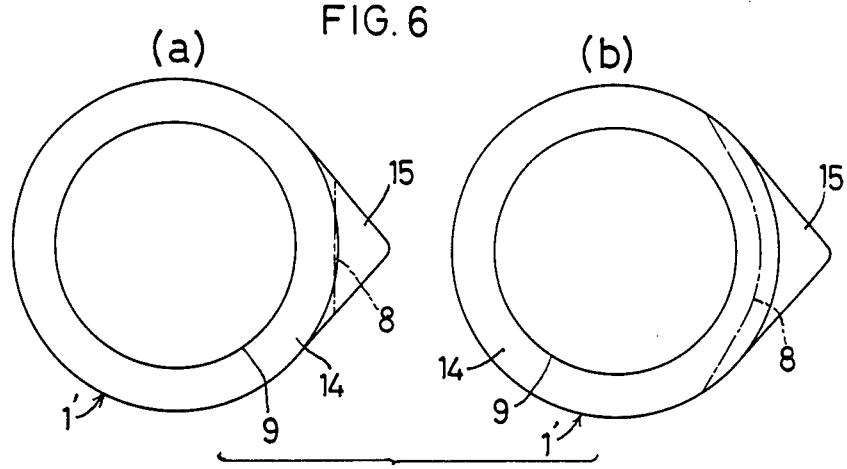
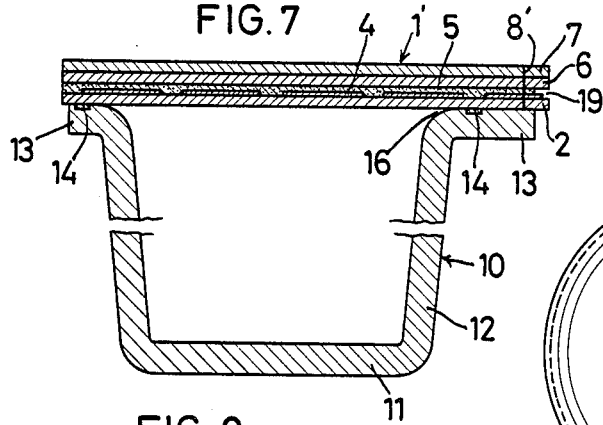
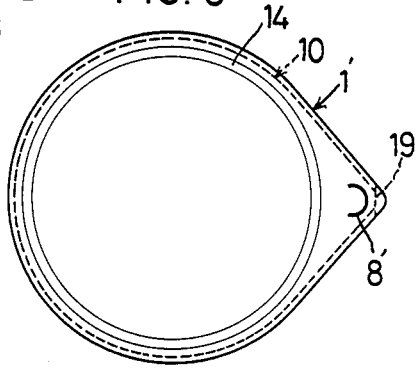
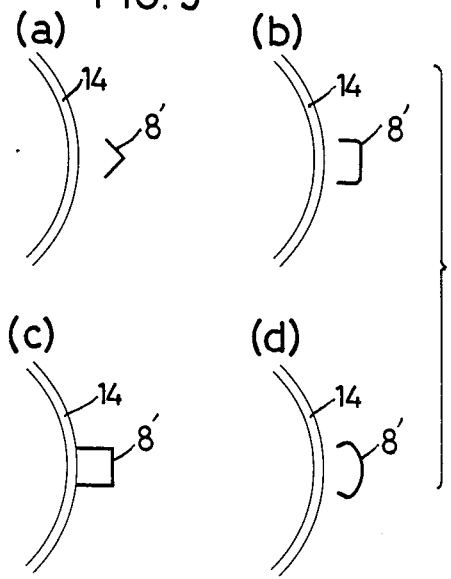
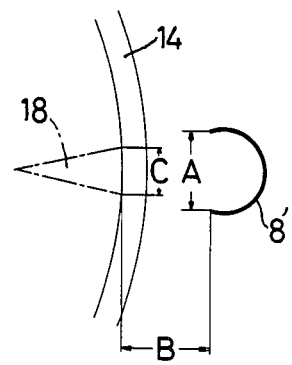

PACKAGING SHEET AND CONTAINERS AND POUCHES USING THE SHEET

The present invention relates to packaging sheet, and food packaging containers and pouches using the packaging sheet and adapted to be heated in a microwave oven for cooking.

Recently, various pre-cooked or half-cooked foodstuffs in a package, which can be served soon after re-heating in a microwave oven, are increasingly coming into the market.

In order to preserve such foodstuffs from deterioration and keep them fresh, it is customary to seal them with a packaging material including a metallic film layer such as aluminum foil having high barrier properties against light, air and moisture. But, the problem with such a metallic film layer is that it reflects microwaves and thus it is impossible to heat the contents when the package containing the food is put into a microwave oven. Also, such reflection may cause the microwave oven itself to break down. Therefore, the contents have to be taken out of the package, put in another container, and wrapped in a wrapping paper before being put into a microwave oven. This was very troublesome.

It is an object of the present invention to provide a packaging sheet used to make a food package or food packaging container which is retortable and has excellent barrier properties against light and gas and which allows the metallic film layer of the sheet to be easily removed by hand, and thus can be put into a microwave oven for cooking.

It is another object of the present invention to provide a food packaging container which cannot burst by the rise in inner pressure of the container if overheated during cooking and which is easy to open after cooking.

It is still another object of the present invention to provide a self-standing food packaging pouch which is normally flat but is self-standable in use, and can stand retort sterilization.

It is yet another object of the present invention to provide a food packaging self-standing pouch which is completely sealed at a portion at which the bottom sheet is heat-fused to side sheets.

The packaging sheet according to the present invention comprises a substrate of synthetic resin and a metallic film layer laminated to the substrate through an adhesive layer and a resin layer having a lower bond strength than the adhesive layer so that the metallic film layer can be easily peeled off.

From another aspect of the present invention, there is provided a food packaging container which has a body and a lid made from the packaging sheet according to the present invention, the lid being heat-sealed to a flange of the container body. Discontinuous cuts or tab-forming cuts are formed in the lid at the heat-sealed portion or outside of it so as to pass through only the substrate of the sheet or through the lid.

From a still another aspect of the present invention, there is provided a food packaging self-standing pouch which has a pair of side sheets and a bottom sheet heat-fused to the side sheets, the side sheets being made from the above-mentioned packaging sheet.

Since the packaging sheet according to the present invention includes a metallic film layer laminated to the substrate of a synthetic resin, the food packaging container or pouch made by use of the packaging sheet has a high strength and excellent barrier properties and can prevent the food contained from deteriorating. Since a metallic film layer is laminated to the substrate through an adhesive layer and a less adhesive layer, the bond strength for the metallic film layer is well balanced to the peelableness. Thus, the metallic film layer can be easily peeled off by hand from the packaging container or pouch before putting it into a microwave oven.

The food packaging container and pouch using the packaging sheet can be used at any stage from storage, transit to cooking, is convenient to handle and saves time and resources.

Because the lid using the packaging sheet for the packaging container is provided with discontinuous cuts or tab-forming cuts, the metallic film layer can be easily peeled off before putting the vessel into a microwave oven. The cut formed in the substrate or through the lid avoids the burst due to the increase in the internal pressure during cooking. Since the pouch is completely sealed at the portion where the bottom sheet is sealed to the side sheets, there is no possibility of water invading the pouch. The self-standing pouch can be made self-standable after the metallic film layers are removed.

The packaging sheet according to the present invention is applicable not only for a lid of containers or side sheets of a self-standing pouch, but also to shallow containers such as trays and dishes.

BRIEF DESCRIPTION OF THE DRAWINGS

Other objects and advantages of the present invention will become apparent from the following description taken with reference to the accompanying drawings, in which:

FIG. 1 is a sectional view of a packaging sheet embodying the present invention;

FIG. 2 is a sectional view of another embodiment of the packaging sheet;

FIG. 3(a)-(c) are plan views showing various patterns which the resin layer may take;

FIG. 4(a)-(d) are views showing the discontinuous cuts in various forms;

FIG. 5 is a partial sectional view of an embodiment of the container embodying the present invention;

FIG. 6 (a),(b) are plan views of the container showing two examples of the discontinuous cuts;

FIG. 7 is a sectional view of another embodiment of the container embodying the present invention;

FIG. 8 is a plan view of the container having a tab-forming cut;

FIG. 9(a)-(d) are views showing various shapes of the tab-forming cut;

FIG. 10 is a view showing how the position and size of the tab-forming cut are determined:

As shown in FIG. 1, the packing or packaging sheet 1 embodying the present invention includes a substrate 2 of synthetic resin, a heat-sealing layer 3 laminated on one surface of the substrate, and a metallic film layer 6 laminated on the other surface of the substrate through a resin layer 4 having a relatively low bond strength and an adhesive layer 5. The metallic film layer 6 may be a metallic foil, metallic deposited film or the like. It is preferable to provide a surface protective layer 7 on the surface of the metallic film layer 6. The layer 7 may be formed by coating a synthetic resin or by bonding a synthetic resin film. A printed layer may be provided on the layer 6.

Figure 11A:
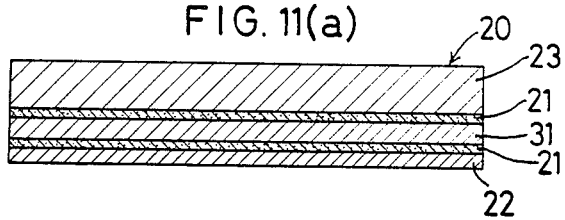
FIG. 11(a)-(e) are sectional views of various examples of the bottom sheet used for the self-standing pouch embodying the present invention.

The synthetic resin for the substrate 2 may be polyethylene terephthalate, polyamide, polypropylene, polyolefin or the like, or combination thereof. Polyethylene terephthalate is most preferable.

The material for the heat-sealing layer 3 may be polyolefin, ethylene-vinyl acetate copolymer, ionomer, vinyl chloride-vinyl acetate copolymer, acrylic resin, methacrylic resin, polyester resin or the like, or combination thereof. For the sheet for a pouch, it should preferably be undrawn polypropylene film, high-density polyethylene film, or linear low-density polyethylene film. If the sheet is used as a lid of a container, depending upon the material of the container proper, one of the above materials which provides easy opening should be selected. The materials commercially available include VMX film (manufactured by Mitsubishi Petrochemical Co., Ltd.) and PPE (trademark) film (manufactured by Toyo Aluminium K.K.) If the substrate itself is heat-sealable, the layer 3 may be omitted. The resin layer 4 should be formed by a resin having a relatively low bond strength, such as vinyl resin, acrylic resin, polyamide resin, urethane resin, silicone resin or the like, or combination thereof. Acrylic resin is most preferable. As a material commercially available, TR-16 varnish (manufactured by Dainippon Ink and Chemicals, Inc.) can be named.

The resin layer 4 may be formed by coating such a resin partially in various patterns such as dot-like, linear or lattice-shaped patterns, as shown in FIGS. 3(a),(b),(c). The layer 4 may be provided either on the surface of the substrate 2 as shown in FIG. 1, or on the metallic film layer 6 or a reinforcing layer 6' which will be described below. What is important is that the resin layer 4 does exist on the interface of the adhesive layer 5. It is preferable that the resin layer 4 occupies 55-99% of the whole of the surface.

As shown in FIG. 2, a reinforcing layer 6' may be formed inside of the metallic film layer 6. The layer 6' may be made from polyethylene terephthalate, polypropylene, nylon, epoxy resin or the like. It serves to prevent the corrosion of the metallic film layer 6 during retort sterilization, and increase the thickness of the layer and serves as a gas barrier layer for easier peeling.

As the adhesive layer 5, two-pack curing type polyurethane adhesive may be used which is formed from polyester polyol or polyether polyol and aromatic or aliphatic isocyanate. EPS 747A/K×75=7/1 ratio by weight (manufactured by Dainippon Ink and Chemicals, inc.) is commercially available.

FIG. 5 shows an embodiment of a container in which the packaging sheet 1 is used as its lid 1'. The lid 1' is provided with discontinuous cuts 8 which extend through the substrate 2. They may take various forms as shown in FIG. 4 (a) to (d). The cuts 8 may be in the form of straight or curved line or lines traversing a heat-sealing portion 14 ranging from a tab portion 15 to a top-in portion 16 of the lid and extending from one end of the lid to the other, as shown in FIGS. 5 and 6.

FIG. 5 shows a container 10 with its opening sealed with the lid 1' comprising the packaging sheet 1. The container 10 has a bottom wall 11, a peripheral wall 12 and a flange 13 formed around its opening. The material for the container 10 may be glass, china, synthetic resin or paper, or combination thereof. It should not reflect or absorb microwaves.

The container may take a circular, polygonal, or any other shape. The lid 1' is put on the flange 13 of the container body 10 and is heat-sealed to complete the container with contents packed therein. When cooking the food in the container, the tab portion 15 (FIG. 6) of lid 1' shown in FIG. 5 is pinched between fingers and pulled to open the lid. When the peeling passes the discontinuous cuts 8 formed in the substrate 2, the cuts will become continuous. Further peeling results in separation of the lid 1', leaving only the substrate 2 on the container proper 10. The container can now be put into a microwave oven to cook.

If the reinforcing layer 6' is provided, it may be peeled together with the metallic film layer 6 in the same manner as mentioned above.

In FIG. 5, the substrate 2 is provided with cuts 9 to avoid the burst owing to the rise in the inner pressure during heating for cooking in a microwave oven.

FIG. 7 shows another embodiment of the container using the sheet 1 as a lid 1' for sealing the container 10. The material and shape of the container proper are the same as the one shown in FIG. 5. The lid 1' is provided with a tab-shaped cut 8' which extends through the lid 1'. The cut 8' may be formed either before or after the lid is heat-sealed to the container proper.

In FIG. 8, the cut 8' is semi-circular, but not restricted to this shape. It may be as shown in FIG. 9 (a) to (d). The cut 8' may reach the heat-sealing portion 14 as shown in FIG. 9 (c), but may not reach the opening of the container body beyond the heat-sealing portion 14, because not only the barrier properties would be lost but the intrusion of dust and various germs or the leakage of the content might occur. The cut 8' may be plural.

The size of the cut 8' should be determined according to the relation between the distance A (FIG. 10) between both ends of the cut 8' and the distance B between one end of the cut 8' and the inner edge of the heat-sealing portion 14. Assuming that the width C of an opening 18 formed by the cut 8' is fixed, the larger the distance B, the larger the distance A should be, and the smaller the distance B, the smaller the distance A should be.

In order to cook the food in the container shown in FIG. 7, the tab formed by the cut 8' is pinched between fingers and is pulled to open and the fan-shaped opening 18 is formed. At an adhesive-missing portion 19 of the lid 1' (FIG. 8), the outer layer including the metallic film layer 6 is separated from the substrate 2. When the outer layer at the portion 19 is pinched and pulled to open, the outer layer will peel all over the surface, leaving the substrate 2 on the container body. Now, the container can be put into a microwave oven to cook.

Since the substrate 2 is formed with the fan-shaped opening 18, the burst due to the rise in the inner pressure during heating in a microwave oven will not occur. After the cooking, when the tab portion of the substrate 2 is pinched and peeled to open, the content will be readily taken out of the container. The fan-shaped opening 18 may be formed in the substrate 2 after the metallic film layer 6 has been removed.

Next, embodiments of a self-standing pouch using the packaging sheet 1 will be described below.

Figure 11B:
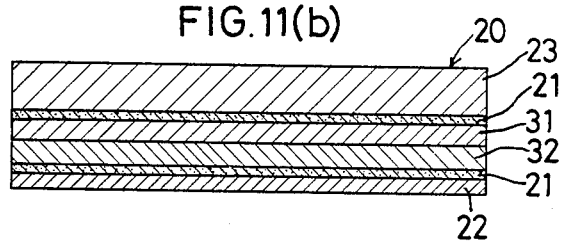
Figure 13A:
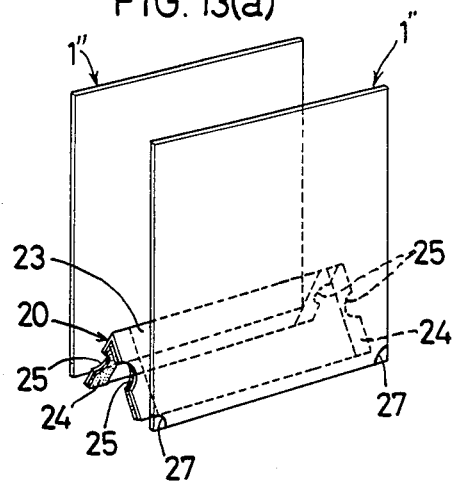
FIG. 13(a) to 13(c) are perspective views of three embodiments of the self-standing pouches embodying the present invention.

FIGS. 13(a) and 14(a) show an embodiment of the self-standing pouch which comprises a pair of the side sheets 1" and the bottom sheet 20 shown in FIG. 11(a) or 11(b). The two side sheets 1" are put one upon another with the heat-sealing layer 3 inside. The bottom sheet 20 is twice-folded and inserted into between the side sheets 1" with its heat-fusing layer 23 outside. The lower edge of the bottom sheet 20 is about the same level as that of the side sheets 1". The peripheries of the side sheets and their portion contacting the side and bottom edges of the bottom sheet 20 are heat-fused to complete a pouch.

The bottom sheet 20 shown in FIG. 11(a) comprises a substrate 22 of a synthetic resin, a gas barrier layer 31 and a heat-fusing layer 23 laminated thereto through adhesive layers 21. The synthetic resin for the substrate 22 may be polyvinylidene chloride, ethylene-vinyl alcohol copolymer, polyvinyl alcohol, or polyacrylonitrile resin, or combination thereof. If the substrate 22 or the heat-fusing layer 13 has a good barrier property, the gas barrier layer 31 may be omitted.

The bottom sheet 20 shown in FIG. 11(b) further has a light shielding layer 32 which may be a layer colored by a printing ink, preferably containing a powder or flake of a metal such as aluminum. The light shielding layer 32 may be omitted by kneading a pigment into the substrate 22 or the heat-fusing layer 23 to given them light-shielding property.

Figure 11C:
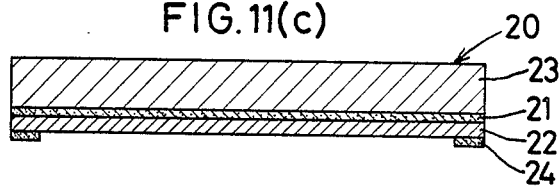
Figure 12:
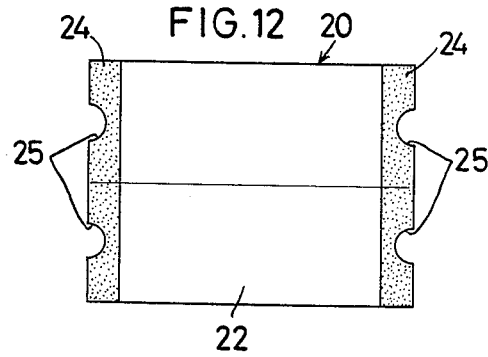
FIG. 12 is a plan view of the bottom sheet of FIGS. 11(c) and 11(e)

As shown in FIGS. 11(c) and 12, a bottom sheet 20 comprises a substrate 22 of a synthetic resin, a heat-fusing layer 23 laminated on one surface of the substrate 22 through an adhesive layer 21, and adhesive layers 24 on the other surface thereof at least at both ends. The substrate 22 may be made from polyethyleneterephthalate, polyamide or polypropylene, or combination thereof. The adhesive layers 24 may be omitted.

The heat-fusing layer 23 may be made from a resin having a good heat-fusibility with the heat-sealing layer 3 of a side sheet 1" such as polyolefin and ethylene-vinyl acetate copolymer. If the substrate 22 is heat-fusible, the heat-fusing layer 23 may be omitted. The adhesive layer 24 may be the same as those enumerated for the resin layer 4. Cutouts 25 are provided in the bottom sheet 20 (FIG. 12) to heat-fuse the side sheets 1" together.

Figure 13B:
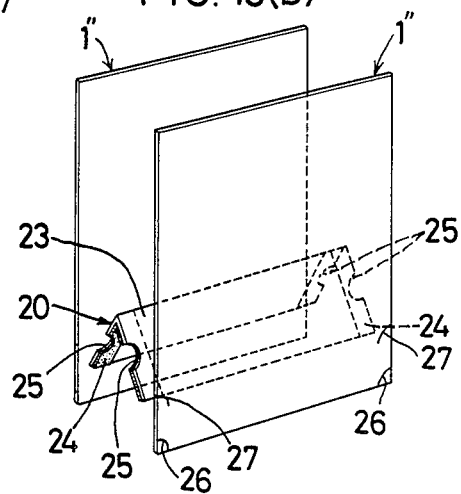

FIG. 13(b) shows another embodiment of the self-standing pouch which comprises a pair of side sheets 1" and a bottom sheet 20. The two side sheets 1" are put one upon another with the heat-sealing layer 3 inside. The bottom sheet 20 is twice-folded and inserted into between the side sheets 1" with the heat-fusing layer 23 outside. The lower edge of the bottom sheet 20 should be located above the lower edge of the sheets 1". Then the peripheries of the side sheets 1" and their portion contacting the side and bottom edges of the bottom sheet 20 are heat-fused to complete a pouch.

The pouch may be made in any other ways. For example, the side sheets 1" may be put one upon another with the heat-fusing layer 23 inside, and doubled, and their peripheries and the portion corresponding to the side and bottom edges of the bottom sheet 20 may be heat-fused to form a pouch.

In the case of pouch shown in FIGS. 13(b) and 14(b), it is provided with half-cuts 26 and 27 at the bottom corners and slightly above the bottom of the side sheets 1", respectively. Such half-cuts should be deep enough to reach the substrate 2 and serve to provide holds when peeling off the outer layer including the metallic film layer 6. Namley, when the pouch is bent along the half cuts, the metallic film layer 6 will be slightly separated off the substrate 2. Pinching there, the metallic film layer 6 can be easily peeled off. Also, in order to remove the metallic film layers from both sides of the pouch, the half-cuts 26, 27 should be formed in both side of the pouch.

Figure 14:
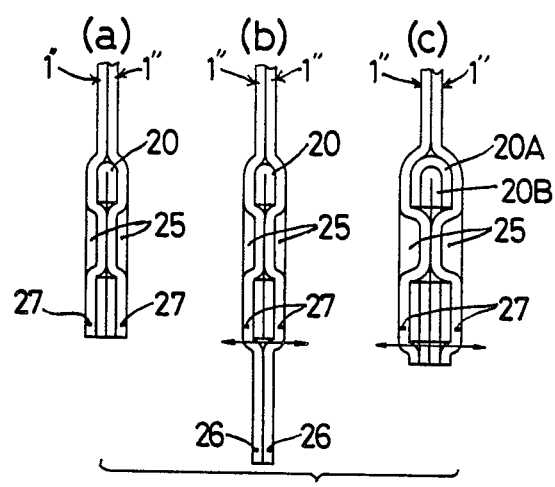
FIG. 14(a)-(c) are sectional side views of the respective self-standing pouches of FIGS. 13(a)-(c)
Figure 15:
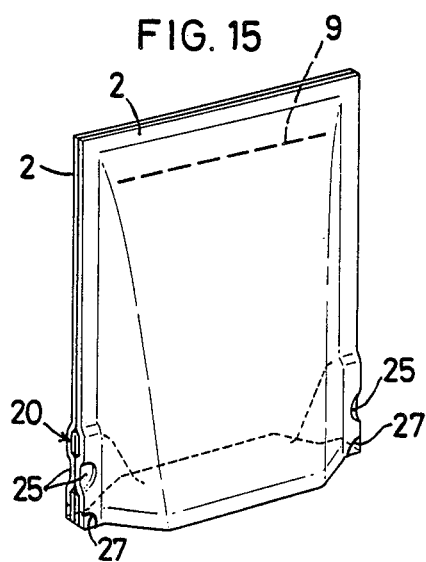
FIG. 15 is a perspective view of a self-standing pouch in a finished state.

The pouch is then cut as shown by the arrows in FIG. 14 (b). Now, the lower edge of the bottom sheet 20 becomes free and can be opened. The pouch can stand on its own. (FIG. 15) The pouch can be put into a microwave oven for cooking. Since the substrates 2 is provided with cuts 9 at the upper end of the pouch, it will not burst even if the content of the pouch is heated. If a reinforcing layer 6' is provided, it can be peeled off together with the metallic film layer 6 in the above-described manner. The metallic film layer 6 may be peeled off by firstly cutting the pouch along a line shown by arrow in FIG. 14 (b), bending the pouch at the half cut 27, and peeling the layer 6.

Figure 11D:
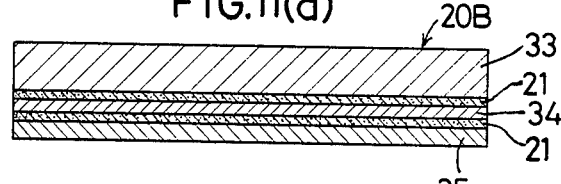
Figure 11E:
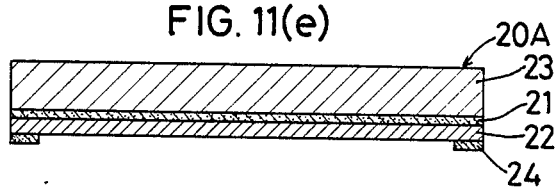

As shown in FIGS. 11(e) and 12, an inside bottom sheet 20A includes a substrate 22 of synthetic resin, a heat-fusing layer 23 outside of the substrate 22, and adhesive layers 24 at least at both ends of the inner surface of the substrate.

As shown in FIG. 11(d), an outside bottom sheet 20B includes a heat-fusing layer 33 laminated on a metallic film layer 34. It is preferable to provide a protective layer 35 on the layer 34. The heat-fusing layer 33 may be formed from a material which is heat-fusible with the heat-fusing layer 3 of the side sheets 1", such as polyolefine or ethylene-vinyl acetate copolymer.

Figure 13C:
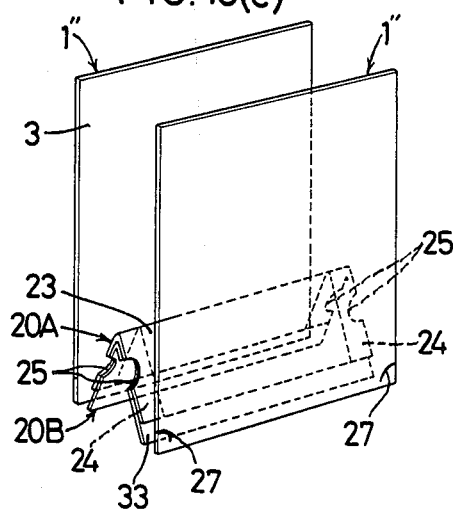

FIGS. 13(c) and 14(c) show another embodiment of a self-standing pouch which comprises a pair of side sheets 1", an inside bottom sheet 20A and an outside bottom sheet 20B. The two side sheets 1" are put one upon another with their heat-fusing layer 3 inside and the inside bottom sheet 20A is doubled and inserted between the side sheets 1" with its heat-fusing layer 23 outside. At both ends of the sheet 20A, cutouts 25 are formed beforehand. The lower edge of the inside sheet 20A is positioned above the lower edge of the sheets 1". The outside bottom sheet 20B, too, is doubled with its heat-fusing layer 33 outside. The sheet has cutouts 25 at both ends at the points corresponding to the cutouts 25 of the inside sheet 20A. The outside sheet 20B is inserted under the inside sheet 20A by adhering the layer 24 to the layer 33. But the bottom edge of the outside sheet 20B extends further downwardly beyond the bottom edge of the inside sheet 20A to substantially the same level as the bottom edges of side sheets 1".

The peripheries of the side sheets 1" and their portions corresponding to the side and bottom edges of the sheet 20A are then heat-sealed to form a pouch. Both edges of the inside bottom sheet 20A are heat-fused with the inner surface of the side sheets 1", and both ends of the inner surface of the inside sheet 20A are heat-fused with the outer surface of the outside sheet 20B. Both side sheets 1" are heat-fused together directly at the cut-out portions 25. The outer surface of the lower edge of the inner bottom sheet 20A and that of the outer bottom sheet 20B are heat-fused with the inner faces of the side sheets 1".

When cooking the pouch of FIG. 13c, a corner of the pouch is bent along the half-cut 27 shown in FIG.

14(C). A metallic film layer 6 can be pinched since it is separated from the substrate 2 at the half-cut 27. The metallic film layer 6 is then pulled together with the surface protective layer 7 to peel them off from the substrate 2. The metallic film layer 6 on the other side of the pouch, too, is peeled off in the same manner. The pouch is cut along the arrow shown in FIG. 14(c). The bottom edge of the outer bottom sheet 20B are heat-fused with the side sheets 1". Since the fused portion is cut, the outer bottom sheet 20B is separated from the side sheets 1", and can be readily peeled off by hand because only both ends of the outer bottom sheet 20B are sealed with the inner bottom sheet 20B through the adhesive layer 24. The self-standing pouch is thus made as shown in FIG. 13C.

What is claimed is:

1. A packaging sheet comprising,
   a substrate of a synthetic resin,
   a metallic film layer laminated to one side of the substrate,
   an adhesive layer disposed between the substrate and the metallic film layer, and
   a plurality of resin segments each intermittently interposed between the synthetic substrate resin and the adhesive layer, wherein the plurality of resin segments has a lower bond strength with respect to the synthetic substrate resin than does the adhesive layer with respect to the synthetic substrate resin.

2. The packaging sheet of claim 1, wherein the plurality of resin segments are in the form of dots.

3. The packaging sheet of claim 1, wherein the plurality of resin segments are in the form of lines.

4. The packaging sheet of claim 1, wherein the plurality of resin segments forms a lattice-shaped pattern.

5. The packaging sheet of claim 1, wherein the plurality of resin segments occupies 55–99 percent of the area of one side of the synthetic resin substrate.

* * * * *